D. C. STONE.
Machine for Making Axes.
No. 699.
2 Sheets—Sheet 1.
Patented April 21, 1838.
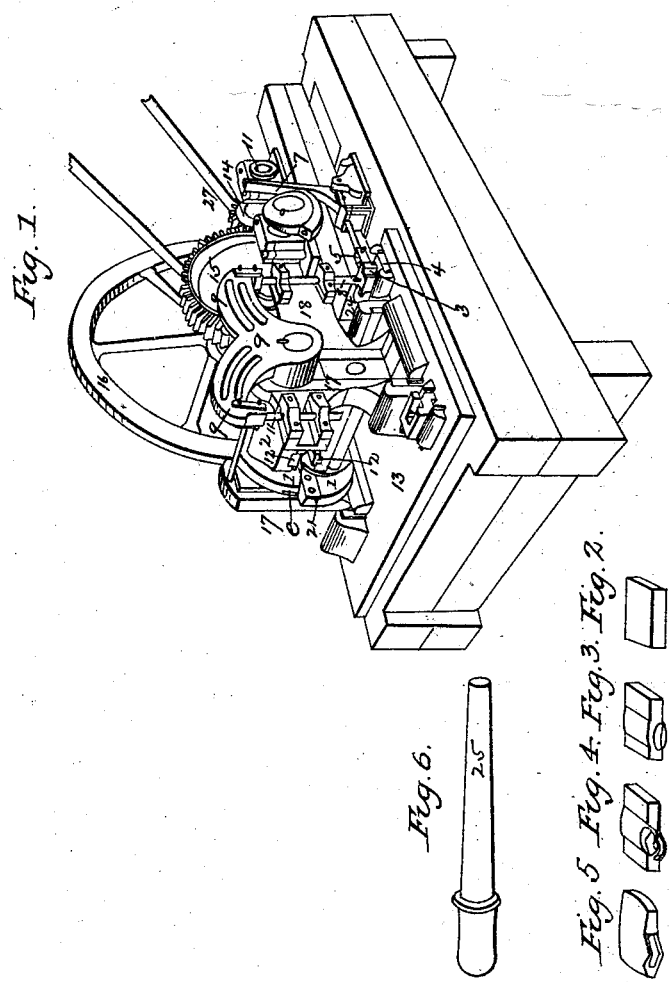

D. C. STONE.
Machine for Making Axes.
No. 699.
2 Sheets—Sheet 2.
Patented April 21, 1838.
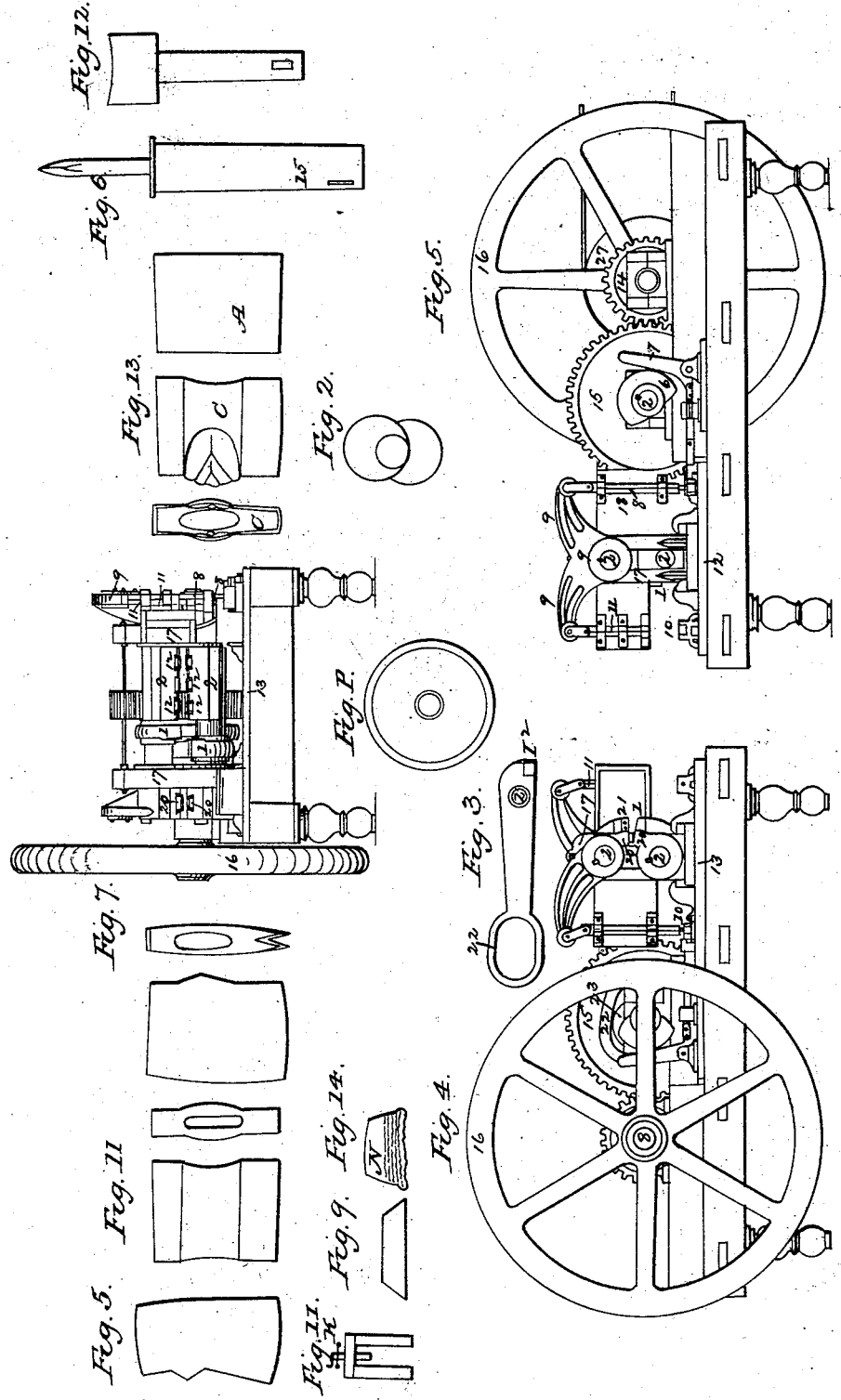

UNITED STATES PATENT OFFICE.

DENMON C. STONE, OF WAWARSING, NEW YORK, ASSIGNOR TO JOSEPH WRIGHT.

MACHINE FOR MANUFACTURING AXES.

Specification of Letters Patent No. 699, dated April 21, 1838.

*To all whom it may concern:*

Be it known that I, DENMON C. STONE, of the village of Naponock, in the town of Wawarsing, in the county of Ulster and State of New York, blacksmith and machinist, have invented, constructed, made, and applied to use a new and useful improvement in preparing the iron part or portion of narrow axes, broad axes, hatchets, and carpenters' adzes, and punching and shaping the same by the machinery of a single machine so that they shall be ready for welding the steel upon them when they have undergone the operations of the said machine, which said inventions is called and known by the name of the "axe-machine," and is specified and described in the words following—that is to say:

This invention or improvement consists of the combination in a single machine of parts hereinafter specified as new and of the machinery hereinafter described for performing the operations, first, of cutting the bars of iron previously rolled and prepared for that purpose into pieces of any desired length, as represented in Figure 2, Plate 1. Secondly, punching the eye of the ax in the said pieces after they have been heated to a red heat in a furnace. Thirdly, driving a steel handle through the eye so as to handle the same and preserve the proper shape during the subsequent operations. Fourthly, shaping the ears of the ax in one die, and smoothing and reducing it in a second die. Fifthly, pressing and shaping the ax in another die after the steel has been welded in.

The shears or cutting machinery (No. 1 of drawing) are composed of two levers Nos. 1, and 1, Fig. 1, Plates 1 and 2, fixed in shafts (No. 2) and are composed of iron or other suitable material, the ends of which project beyond the shafts and being armed with steel 21, 21, Fig. 4, cut the iron bar as it is presented to it in the usual way of cutting bar iron for that purpose.

I do not claim anything as original in this mode of performing that operation.

The levers are worked by eccentric wheels, Fig. 2, Plate 2, one of which is shown in Fig. 4, same plate, which are fitted into strong iron rims, No. 22, Figs. 3 and 4, at their ends, which rims are of such elliptical form that the largest diameter is twice the distance from the center of the shaft on which the eccentric wheel revolves, to that part of the circumference of the wheel farthest from the said center of the shaft. The shafts, No. 2, 2, on which the said levers are fixed are placed one directly above the other. Each of these shafts is both a fulcrum for the lever fixed on it and a bed for the dies before mentioned.

When the iron has been cut and properly heated it is introduced into a chamber (No. 3) Figs. 1 and 5, Plates 1 and 2, formed by a base or stand of cast iron or other suitable material (No. 4) which stand is fixed at the sides by keys movable at pleasure to regulate the size of the chamber according to the size of the ax. The sides of the chamber are formed of pieces of cast iron or other suitable material fixed permanently in the base or stand above mentioned and through an opening of any size that may be desirable in one of those sides, a slide (No. 5) composed of iron or other suitable material enters which is moved into the chamber for the purpose of compressing and holding the iron firmly in its place. This is worked by means of a cam (No. 6) and lever (No. 7) which lever as the cam revolves pushes the said slide forward or backward, holding the iron firmly in its place until the punch in the sliding shaft (No. 8) has penetrated it as far as it is permitted to do. The backward motion of the slide then releases it when it is taken by the workman and inverted for the purpose of presenting the opposite side to the punch. A screw, No. 24, at the closed end of the chamber regulates or sets the iron for the punch.

The punch, Fig. 6, No. 25, Plates 1 and 2, is formed of steel of proper shape and dimensions for the eye of an ax, hatchet, &c., and is fastened into the socket of a hollow sliding shaft of iron, No. 8, supported by a stand (No. 18) attached to the main stand (No. 7) with suitable boxes by one or more keys. This sliding shaft is fixed into the end of a lever beam (No. 9, 9, 9) which is fixed upon and worked by the shaft through which the upper lever composing the shears passes. After the iron has been thus punched through in this chamber it is placed in a second chamber (No. 10) Fig. 11, under the other end of the lever beam (No. 9, 9, 9). This chamber is of similar construction to the first except that it is closed on both sides and has no slide. This is for the purpose of driving the steel handle, above mentioned through the eye. This steel handle of proper form and size to correspond with the punch used in the first chamber, is then forced through the eye of the ax by a sliding shaft (No. 11) supported and worked in the same manner as the sliding shaft (No. 8) at the end of the lever beam as last above mentioned, and the ax is then ready to be introduced into the first of the dies before mentioned.

The two main shafts (No. 2, 2) are armed with dies (No. 12, 12) upon the upper side of the lower and the lower side of the upper shaft, which are fastened in their places with keys and may be changed at pleasure. The main shafts are fixed in iron stands (No. 17, 17) of suitable proportions similar to those used in machines for rolling iron and are worked by the main levers as above mentioned. The first dies (No. 12, 12) are of such a form that the ax is pressed so as to bring out the ears of the ax to a proper shape, Fig. 11, Plate 2, and Fig. 3, Plate 1, by means of the figure given to the dies, and the vibratory motion communicated to the shaft by the main levers as aforesaid. The ax is then taken out and introduced edgewise into a second set of dies in the same shaft so as to press the edges into proper shape, Fig. 4, Plate 1, and Fig. 13, Plate 2. It is then passed to the third pair of dies in the same shaft where it is again smoothed down and receives its final shape, Fig. 5, from the figure of the dies and is then ready to be split (as at Fig. 7) in chamber (No. 19) for receiving the steel chisel, Fig. 12, worked similar to the punching operation. After the steel which may be fitted for that purpose by heating and cutting to shape, Fig. 3, and pressing in a die of proper form, Fig. 14, has been welded in the ax and hammered to near its proper shape it is then passed into a fourth set of dies, No. 20, in the same shaft where it is pressed into its proper shape and is then ready for grinding.

The above described parts of the machine are to rest or be fixed upon a bed plate (No. 13) of cast iron or other suitable material.

The whole machine is to be worked by water power, steam or any other mechanical power of sufficient force, which may be communicated to the eccentric wheels, Figs. 2 and 23, Plate 2, by means of a pinion wheel (No. 14) cog wheels, &c., with a balance wheel (No. 16) to regulate the motions of the eccentric by a driving pulley, No. 27.

I claim as my original invention—

1. The combination of the various parts above specified so as to make a single machine capable of preparing axes for the steel as above described.

2. I also claim as my original invention the first chamber above specified as to the manner of holding and releasing the ax by the means above specified and of punching the eye as set forth and specified, in combination.

In testimony whereof and that the above is a true specification of my said invention and improvement as above described I have hereunto set my hand this seventh day of September one thousand eight hundred and thirty-seven.

D. C. STONE. [L. S.]

In the presence of—
RALPH I. LOCKWOOD,
A. H. SOUTHWICK